Feb. 23, 1926.

W. Y. FARNSWORTH 1,574,564

FORMING MACHINE

Filed Oct. 9, 1922

Inventor
WILLIAM Y. FARNSWORTH
Richard J. Cook
ATTORNEY

Feb. 23, 1926.

W. Y. FARNSWORTH 1,574,564

FORMING MACHINE

Filed Oct. 9, 1922

Inventor
WILLIAM Y. FARNSWORTH
By Attorney
Richard J. Cook

Feb. 23, 1926.

W. Y. FARNSWORTH

FORMING MACHINE

Filed Oct. 9, 1922

Inventor
WILLIAM Y. FARNSWORTH
By Richard J. Cook
Attorney

Feb. 23, 1926.

W. Y. FARNSWORTH

FORMING MACHINE

Filed Oct. 9, 1922

INVENTOR
WILLIAM Y. FARNSWORTH,
By
Attorney
Richard J. Cook

Feb. 23, 1926.  
W. Y. FARNSWORTH  
FORMING MACHINE  
Filed Oct. 9, 1922

Inventor  
WILLIAM Y. FARNSWORTH  
By Attorney  
Richard J. Cook

Feb. 23, 1926.

W. Y. FARNSWORTH

1,574,564

FORMING MACHINE

Filed Oct. 9, 1922 8 Sheets-Sheet 6

Inventor
WILLIAM Y. FARNSWORTH
By Richard J. Cook
Attorney

Patented Feb. 23, 1926.

1,574,564

UNITED STATES PATENT OFFICE.

WILLIAM Y. FARNSWORTH, OF SEATTLE, WASHINGTON.

FORMING MACHINE.

Application filed October 9, 1922. Serial No. 593,256.

*To all whom it may concern:*

Be it known that I, WILLIAM Y. FARNSWORTH, a citizen of the United States, and a resident of Seattle, county of King, State of Washington, have invented certain new and useful Improvements in Forming Machines, of which the following is a specification.

This invention relates to improvements in forming machines, and more particularly to machines of that character for forming paper caps for milk bottles or the like.

The principal object of the invention is to provide a machine of the above character for forming bottle caps, each with a peripheral flange that is adapted to receive and yieldably grip the rim that is formed about the neck of a bottle of the character for which such caps are intended, in such manner as to functionally hold the cap in place, which will add to the sanitation of the container to which such caps are applied and will effectively protect its contents.

Another object of the invention is to provide a machine of the above character embodying mechanism whereby the paper from which the caps are formed is advanced successively through a printing mechanism, a steaming oven and beneath the blanking dies, and wherein previously experienced breaking or tearing of the moistened paper strip, in machines of this character, is avoided by the provision of mechanism which advances the strip continuously from the supply roll, through the printing mechanism and steaming oven, and then moves it intermittently beneath the blanking die, as distinguished from mechanism that was formerly employed which advanced the web intermittently and against a heavy pull from the starting point.

Another object of the invention is to provide a machine of the above character wherein speed of production, and the life and efficiency of operating parts is increased by providing for continuous, and avoiding any intermittent movement of heavy parts.

Another object resides in the provision of a forming machine of this character together with means and mechanism for applying a protective coating of paraffin, or the like, to the finished product, and for packing the products in bags or cartons for distribution and shipment.

Another object resides in the provision of means for varying the degree to which the paper strip, from which the articles are formed, may be moistened before passing to the forming machine.

A still further object of the invention is to provide a machine of the above character that will be economical and practical in its operation, and which will efficiently and successfully perform the work for which it is intended.

The general objects and purposes of the machine above stated, and other objects and purposes hereinafter described are attained with improvements in mechanism, the preferred forms of which are illustrated in the accompanying drawings, wherein—

The paper used in forming the caps manufactured by the present machine, is prepared in a continuous, narrow strip and is preferably wound in rolls about spools whereby it may be conveniently and suitably supported in position to be delivered into the machine. If it is desired, or required, that certain printing be placed on the caps, the paper strip is advanced, as it leaves the roll, through the desired printing mechanism so that the printing may be placed on the paper strip before it enters the forming machine proper.

After the strip enters the forming machine, it is drawn by continuously driven rollers through a steaming oven, where it is sufficiently moistened to permit the cup blanks later cut therefrom to be pressed and baked in the desired form, and is then advanced by an intermittently moving mechanism beneath a reciprocating die head which cuts out the cap blanks, and crimps their edges to partly form them in the shape of the finished cap.

From the blanking dies the caps, partially shaped, are advanced to the forming and baking dies, which receive and press them into the required shape, then electrically bake them so that, when they are delivered therefrom, they have a fixed and permanent shape. After being thus formed the caps are delivered through a paraffining device and are then mechanically packed for shipment.

The mechanism for carrying out the work above recited will be understood best by reference to the accompanying drawings, wherein—

1 designates the strip, or web, of paper from which the caps are formed. This is preferably wound about a spool 2, forming a roll 3 that may be revolubly supported, in any suitable manner such as by the brackets, or stand, 4 so that the strip may be drawn from the roll and fed into the forming machine.

In the present machine, the strip 1 is extended from the roll 3 through a rotary printing mechanism, indicated at 5, whereby any desired or required printing may be placed on the strip to appear on the outer face of the formed caps in order to designate the grade, kind, class, etc., of goods which is held in the containers to which the caps are applied.

The forming machine proper comprises a horizontal base frame 8, which may be of any suitable construction that will substantially support the operating parts of the machine, and an upper frame portion 9 which is fixed upon the base frame to support the blanking and forming dies and the principal gearing whereby the mechanism is operated.

Figure 1:
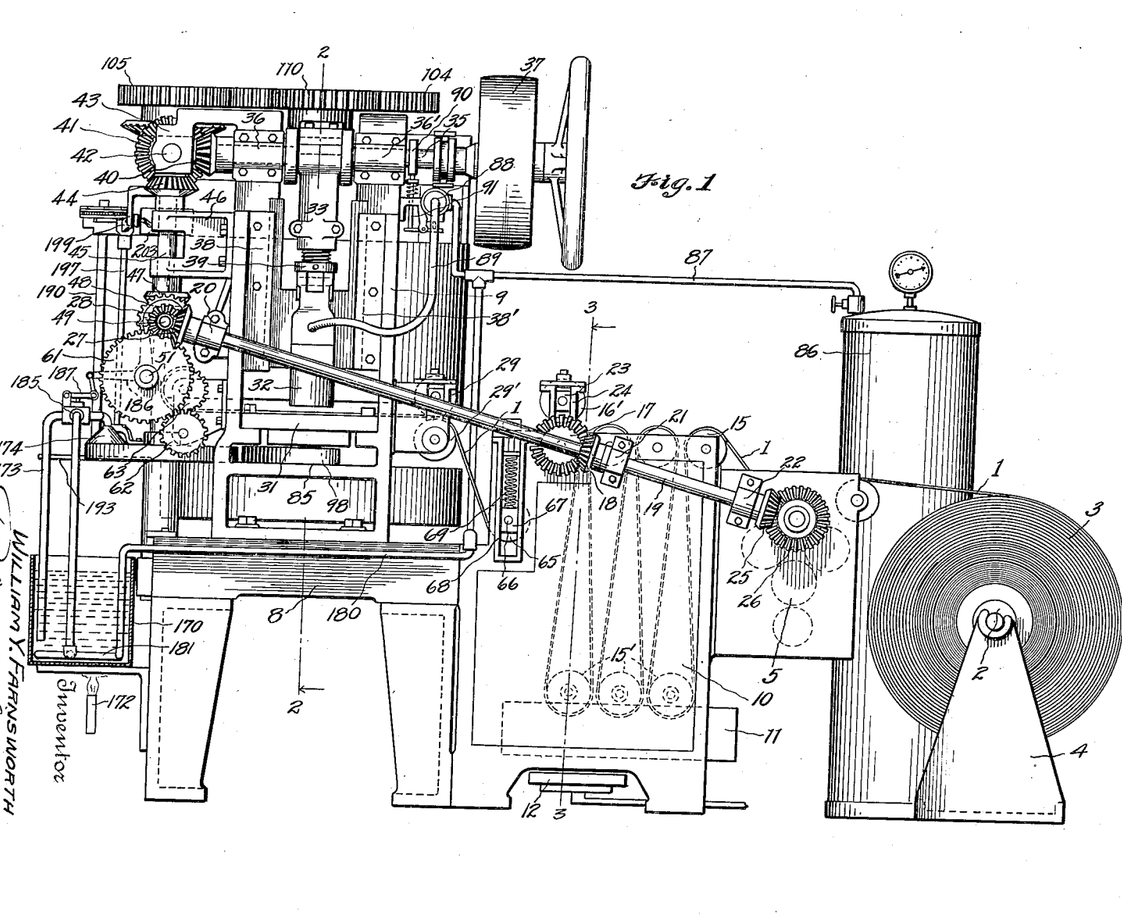
Figure 1 is a side elevation of a forming machine constructed according to the present invention.

Located adjacent the intake side of the machine is a steaming oven 10 within which a pan 11 for containing water, is slidably supported in such manner that it can be moved into and from the oven and beneath which a burner, or heating element 12, is located to heat the water to cause steam to rise within the oven. Arranged along the top of the oven, and just above the pan 11, respectively are rollers 15 and 15', over which the strip 1, after it has been threaded through the printing mechanism, is extended, as is shown in Fig. 1, in such manner that a considerable length is contained within the oven, and the time required for any part of the strip to be advanced through the oven will be long enough that the strip will become sufficiently moist for the following forming process. If it is necessary or desirable, the strip could be passed through the water in the pan to more quickly and thoroughly moisten it. It is apparent also that the degree to which the strip is moistened could be regulated by the adjustment of the pan into or from the oven to produce more or less steam accordingly as is desired.

Figure 3:
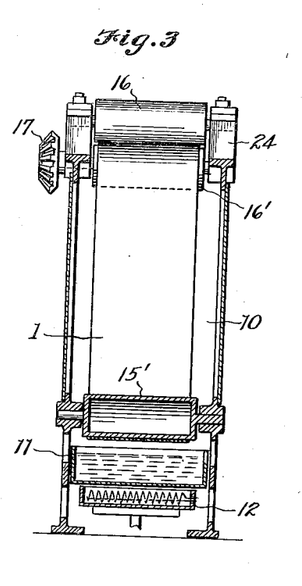
Figure 3 is a transverse section, taken on the line 3—3 in Fig. 1 showing the steaming chamber wherein the web is moistened.

At the side of the oven where it passes out to the forming machine, the strip is threaded between driving rolls, 16 and 16' Figs. 1 and 3, which are supported by the upper side members of the oven frame. The roller 16' is tensioned against the roller 16 and the latter is continuously driven by means of a bevel gear 17 that is fixed to the roller axle and which operates in mesh with a gear wheel 18 that is fixed on a driven shaft 19 mounted along the side of the machine in supporting bearings 20, 21 and 22. The axle of the roller 16' is supported at its opposite ends in blocks 23 that are slidable in guide ways 24 so that this roller may be yieldingly tensioned against the strip by means of springs placed between the blocks and upper ends of the guideways.

The shaft 19, at one end, is also equipped with a gear wheel 25 that operates in mesh with a gear wheel 26 whereby the inking and type rolls of the printing mechanism are operated, and at its opposite end has a bevel driving gear 27 fixed thereto that operates in mesh with a driven gear 28 that is mounted and driven by mechanism presently described.

Figures 6, 7, 8:
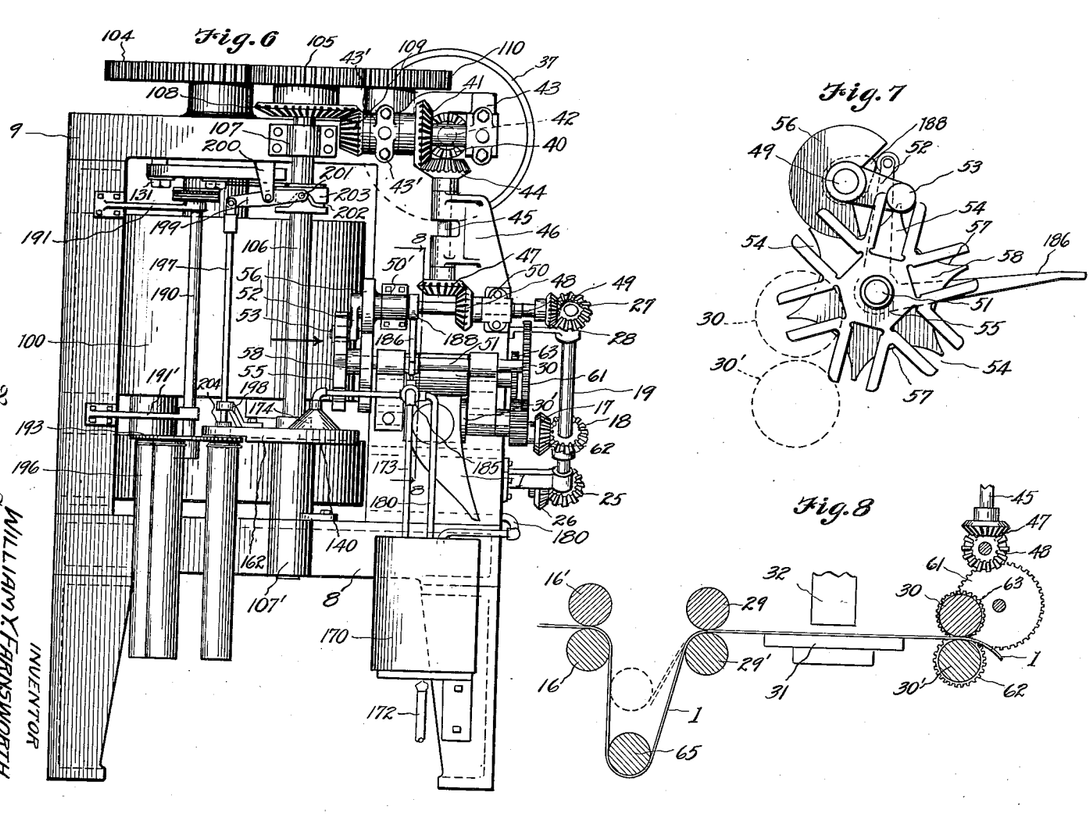
Figure 6 is the left end elevation of the machine, particularly showing the driving and timing gears, the paraffining device and the packer mechanism.
Figure 7 is a face view of the Geneva gear mechanism for intermittently advancing the paper strip between the blanking dies, looking at the same in the direction of the arrow in Figure 6.
Figure 8 is a sectional view, taken substantially on the line 8—8 in Fig. 6, showing the advancing rollers, and drive mechanism associated with the mechanism illustrated in Figure 7, whereby the paper strip is advanced between the blanking dies.

Supported, at opposite sides of the frame 9, slightly above the base 8, are paired feed rollers 29—29' and 30—30', Figs. 1 and 8, by which the paper strip is guided and intermittently advanced between a die plate 31, that is fixed horizontally within the lower part of the frame 9, and a reciprocating die head 32 mounted at the lower end of a pitman 33 which, at its upper end, is attached to an eccentric crank portion, or journal, 34 of a horizontal driving shaft 35, that is revolubly supported in bearings 36—36' at the upper end of the frame 9 and is driven through the medium of a belt wheel 37 having clutch connection therewith.

The reciprocating die head 32 is slidably mounted for reciprocation between guide plates 38—38' that are fixed to the opposite side plates of the frame 9, as shown in Figure 1, and the die thereon may be accurately adjusted, toward or from the die 31, by the turning of an adjusting screw 39 which connects the head to the pitman.

At one end of the driving shaft 35 is a beveled gear 40 which meshes with a larger beveled gear 41 that is fixed on a short shaft 42 revolubly supported, by brackets 43 and 43', at right angles to the shaft 35. The gear 41 in turn meshes, at its lower side, with a gear 44 that is fixed on a short shaft 45, revolubly supported by a bracket 46, and which at its lower end has a beveled gear 47 fixed thereto to operatively mesh with a similar gear 48 keyed to a horizontal shaft 49 that is supported from the frame 9 by bearing brackets 50 and 50'.

The shaft 49, at its forward end, has the previously mentioned beveled gear 28 fixed thereto for driving the shaft 19 which causes the paper strip to be advanced through the printing mechanism and steaming oven, and at its opposite end has a Geneva gear driving connection with the inner end of a shaft 51 that is mounted parallel to, and below the shaft 49. The connection comprises a crank arm 52 that is fixed on the shaft 49 and which at its end has a laterally extending pin 53 adapted to move into and from a plurality of radially directed slots 54 in a wheel 55 fixed on the shaft 51, so that each rotation of the shaft 49 will rotate the wheel 55 and shaft 51 through a definite angle; the shaft 51 being prevented from turning at times when the wheel 55 is not engaged by the crank by the interlocking of a disk segment 56, that is fixed on the shaft 49, within concaved surfaces 57 in a disk 58 that is fixed on the shaft 51 adjacent to the slotted wheel 55.

At its outer end the shaft 51 has a gear wheel 61 fixed thereto which meshes with a gear 62 that is fixed on the axle of the strip advancing roller 30'. This latter gear 62 also meshes with a gear 63 of the same diameter that is mounted on the axle of the roller 30 so that these two rollers, between which the paper strip is threaded, are intermittently revolved by the intermittent movement provided by the Geneva gearing, to intermittently advance the strip between the blanking dies 31 and 32. The timing of the movements of the reciprocating die and the advancing mechanism is such that the strip will be stationary during the blanking out process.

Since the strip is advanced continuously through the steaming oven, and then moved intermittently through the forming machine, it is apparent that in order to keep the strip taut as it passes through the machine, a means for taking up the resultant slack is necessary. Such a means is provided by a take up roller 65, Figure 1 and Figure 8, the axle 66 of which is supported at its ends in blocks 67 that are slidable in a vertical guideway 68 in the oven frame. These blocks are urged downwardly by springs 69 located in the guideways so that the roller engages the strip and keeps it taut while moving, or still.

The principal point to be noted in the strip feeding mechanism is, that by driving the rollers 16 and 16' continuously there will be a steady and continuous pull on the strip as it moves from the supply roll, through the printing mechanism and steaming oven, and this pull, while being heavy, will not cause the strip to break or tear as would be the case should the strip be advanced against heavy pull intermittently from the starting point, and that where the advancing is necessarily intermittent, the strain or tension on the strip is very slight and there is no danger of its being broken.

Figures 12, 13, 23:
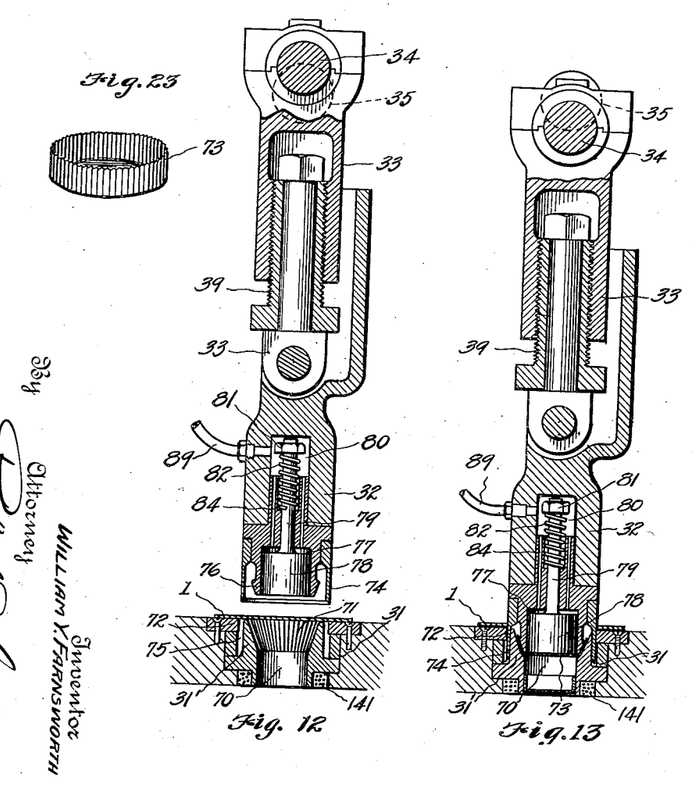
Figure 12 is an enlarged, longitudinal view of the blanking dies in open position, while the paper web is being advanced.
Figure 13 is a similar view of the parts after a cap blank has been cut from the web.
Figure 23 is a perspective view of a partially formed cap, as discharged from the blanking dies.
Figure 14:
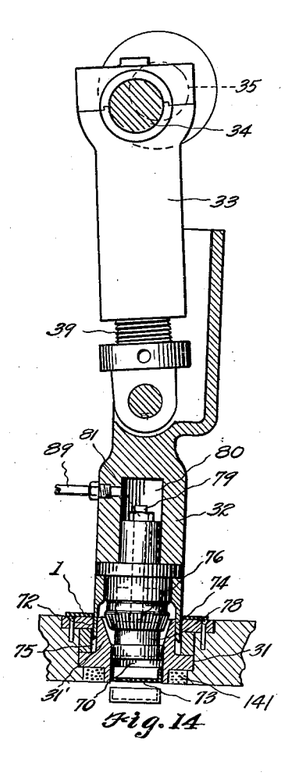
Figure 14 is a similar view showing the air actuated die plunger extended to push the cap through the lower die member.

The function and operation of the blanking dies 31 and 32 is best illustrated in Figures 12, 13 and 14 which respectively show the relative positions of these parts when they are separated to permit the paper strip to be advanced, when they are in cutting relation, and when the air plunger has been extended to advance the cap blank through the base die opening.

The base die consists of a circular block 51' having a central, circular opening 70 therein which, at its upper end, has a conically flared portion 71 closely corrugated, in a vertical direction as is illustrated in Figure 12. This opening is concentric with the axial line of the vertically reciprocating die head 32 and lies directly beneath and centrally within the path of the paper strip 1 as it is advanced between the dies. This block has an annular supporting flange whereby it is mounted within the plate 31 and an annular cutter member 72 is mounted concentrically about the block and spaced slightly therefrom.

The reciprocating die head 32 comprises a circular cutter blade 74 adapted to move cooperatively within the ring 72 to cut the cap forming blanks from the strip as the reciprocating head is moved downwardly and to be extended into an annular channel 75 about the block 70. Within this cutter 74, is a circular and conically tapered head 76, which is also corrugated about its periphery to conform to the corrugated section 71 in the block 70 and is adapted to engage the circular blanks after they are cut from the strip and to press them into the opening 70 so that they assume the shape of shallow cups 73 with corrugated walls, as shown in Figures 14 and 23.

Mounted for reciprocation within a concentric bore 77 in the head 76 of the reciprocating die is a plunger head 78 supported by an upwardly extending stem 79 that operates at its upper end within a pocket 80. At its upper end the stem has a nut 81 secured thereon and a spring 82 is wound about the stem to bear against the nut to hold the plunger normally at its upper limit of travel and with its lower surface flush with the lower surface of the head 76.

After the cap blanks have been cut from the strip by a downward movement of the die 32 from the position as shown in Figure 12 to the position shown in Figure 13, and pressed into the base die opening, as is shown, they are advanced through the opening by the extending of the plunger 78; such extension taking place with the initial upward movement of the head 32 and is effected by the admittance of air under high pressure into the pocket 80 and which passes from the pocket, through channels 84 into the base of the bore 77 and against the plunger to force the latter outwardly against the cap blank to forward it through the opening 70 and onto a receiving plate 85.

The air for actuating the plunger is delivered from a storage tank, as illustrated at 86, through a conduit 87 to a valve 88, and from the valve through a flexible conduit 89 to the reciprocating die. The valve is operated by means of a cam 90 on the shaft 35 which is timed to engage a valve actuating rod 91, to open the valve and admit the air at the proper time. The return of the plunger to normal position, after the air is cut off, is effected by the spring 82; leakage being provided for about the plunger whereby the confined air may escape.

As the cap blanks are delivered onto the receiving plate 85 they are forwarded by the arms 95 of an advancing plate 96. This plate is mounted adjacent the lower end of a vertically supported shaft 97 and revolves in horizontal plane so that its arms take up the caps as they are delivered from the opening 70 and advances them within a guide way 98 and onto an annular, horizontal shelf 99 of a revolubly mounted drum 100.

The drum 100 is mounted upon and adapted to be revolved by a shaft 101 which is revolubly supported at its opposite ends respectively in upper and lower bearings 102 and 103 in the frame members and at its upper end has a gear wheel 104 fixed thereon which operates in mesh with a gear wheel 105. This latter gear wheel is keyed to the upper end of a vertical shaft 106, mounted in bearings 107 and 107', as shown in Figure 6, and has a beveled gear wheel 108 formed therewith which is driven by a bevel gear 109 at the inner end of the driven shaft 42.

Figures 4, 5:
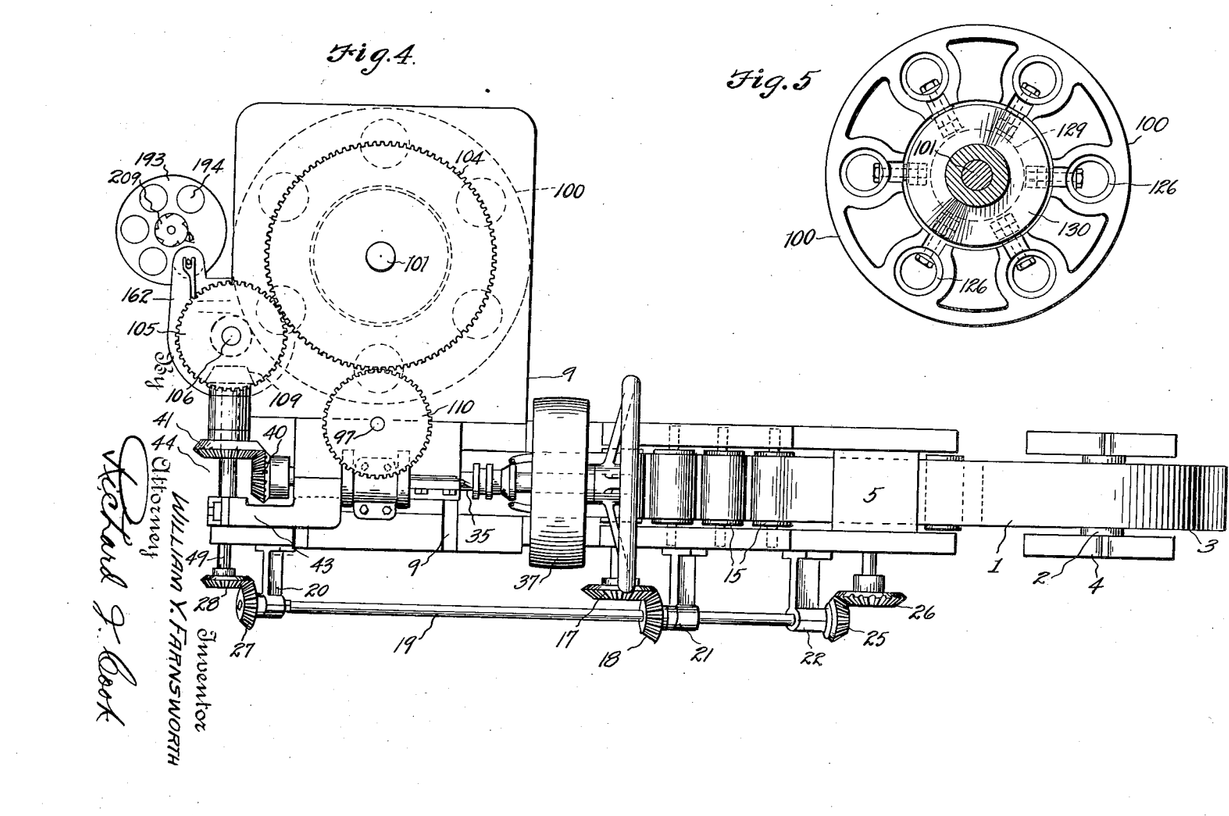
Figure 4 is a plan view of the machine.
Figure 5 is a horizontal section, taken on the line 5—5 in Fig. 2 showing the disposition of the forming dies in the revolving drum and the cam for actuating the same from closed to open position as the drum revolves.

The shaft 97 has a gear wheel 110 fixed to its upper end, Figure 4, which operates in mesh with the gear 104 and in this manner the shaft 97 and advancing plate are properly timed and operated.

Located within the base portion of the drum 100 and within the shelf 99 at equal distances apart and at equal radial distances from the center of the drum supporting shaft 101, are forming dies 115. These are of such character that they will receive the caps as delivered from the blanking dies.

Figure 9:
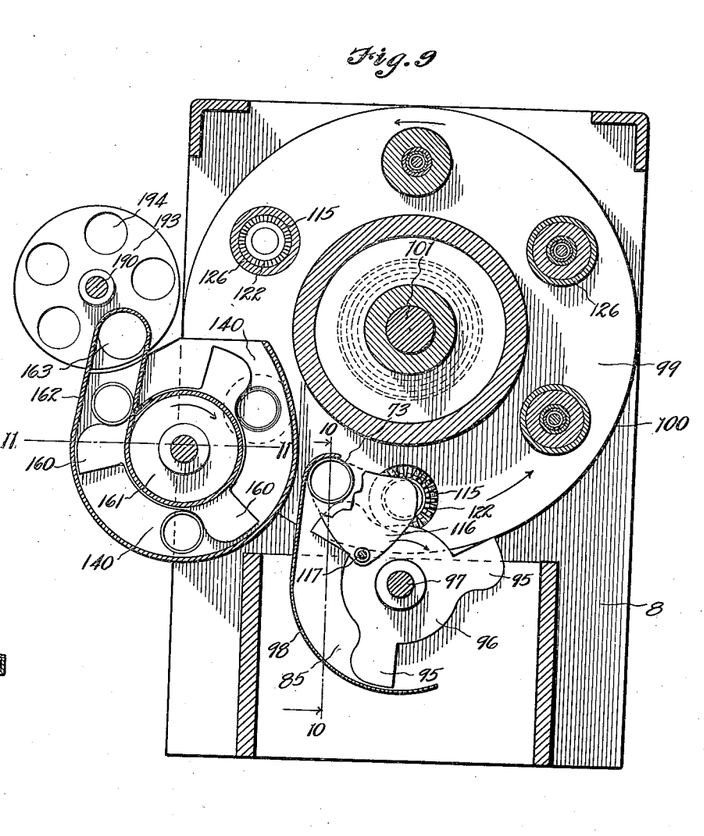
Figure 9 is an enlarged horizontal section taken on the line 9—9 in Fig. 2, particularly illustrating the means for advancing the caps from the blanking dies to the forming dies, and from the forming dies to the packer mechanism.
Figure 10:
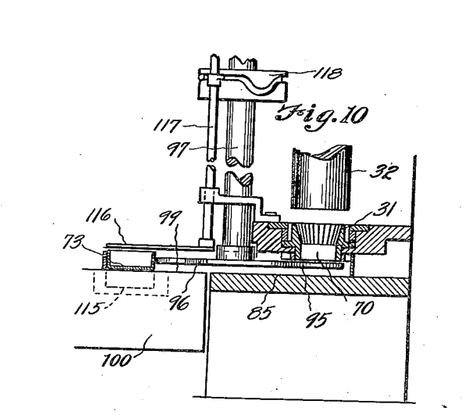
Figure 10 is a vertical section taken substantially on the line 10—10 in Figure 9.
Figure 11:
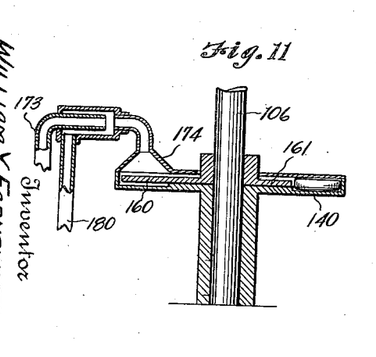
Figure 11 is a vertical sectional view on the line 11—11 in Fig. 9, showing in detail the means for applying paraffin to the caps as they are delivered through the discharge mechanism.

Referring to Figure 9, which best shows the advancing mechanism, it will be seen that the guideway 98 ends at such position that the caps advanced by the arms of the delivery plate will be held therein within the path of the forming dies, and that as the drum revolves, the caps will be dropped into these dies as they successively pass beneath the inner end of this guideway. In order to insure the advancing of the caps into the dies and the proper positioning of the same when dropped, I have provided a presser plate 116 which is supported at the lower end of a vertically reciprocating shaft 117 that is raised and lowered in accordance with the delivery of the caps thereunder by suitable connection with a cam 118 that is fixed on the shaft 97. This plate is held in a raised position until such times when the caps are dropped into the forming dies and then it is lowered to press the cap into and center it within the die.

The drum 100, here shown, comprises six forming dies, all of which are identical in operation and in construction, and the proportion of the driving gears of the mechanism is such that the drum is revolved once to six revolutions of the die reciprocating shaft 35, and once to two revolutions of the shaft 97 which revolves the advancing plate 96 which has three delivery arms; the shaft 19 revolves continuously and the intermittent gear mechanism operates in accordance with the reciprocating die 32.

Figure 15:
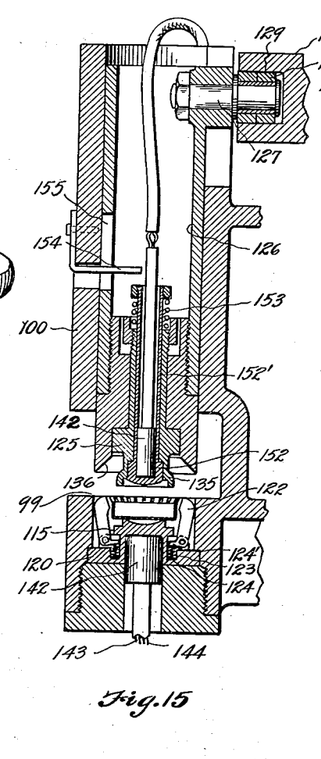
Figure 15 is an enlarged sectional view of one of the forming dies in open position.
Figure 16:
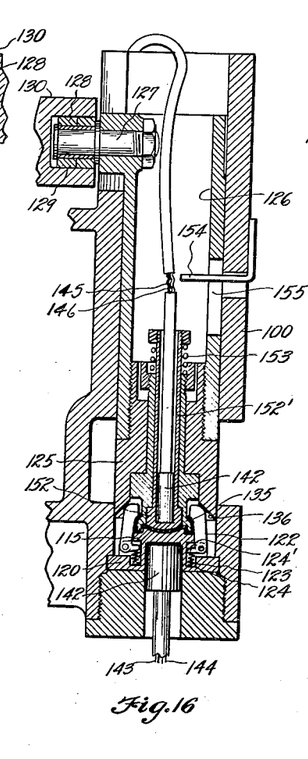
Figure 16 is a similar view of a die in closed position in the process of forming a cap.
Figure 17:
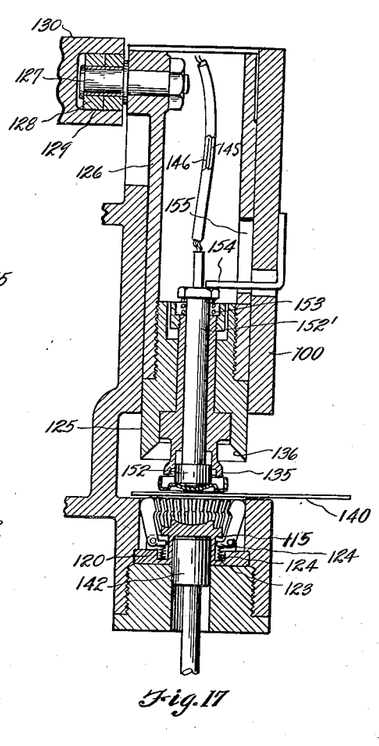
Figure 17 illustrates the removal of a cap from the die by its plunger and its delivery onto the discharge table.

The construction and manner of operation of the forming dies is best shown in the enlarged views of Figures 15, 16 and 17; the first of which shows the relative positions of the dies when a cap is delivered into the base die from the guideway 98; the second shows the cap being pressed into shape, and the third illustrates the manner of discharging the formed cap onto the discharging table.

Each of the base dies consists of a circular base block 120 that is set within a circular opening in the drum shelf, and about which are pivotally mounted a plurality of upwardly extending, folding fingers 122 having rounded, and inwardly turned ends 122'. These fingers are normally urged outwardly, each by means of a spring 123 which is set within a socket 124 in the block 120 and engage inwardly directed arms 124' on the lower ends of the fingers. When in this open position, the dies will receive the partially formed caps therein as is shown in Figure 15.

Figure 2:
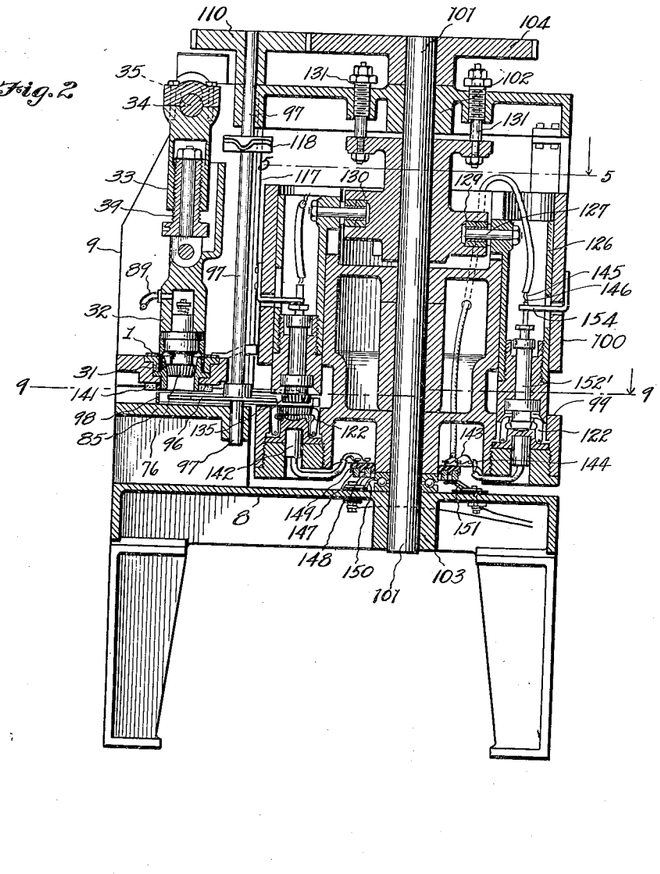
Figure 2 is a transverse, sectional view of the same, taken on the line 2—2 in Fig. 1, particularly illustrating the blanking dies, the forming dies in the revolvable drum, and means for actuating these parts.

Slidably mounted in the upper portion of the drum are reciprocating die members 125, which are cooperatively located with respect to the base dies and each comprises a cylindrical body portion 126 provided at its upper end with an inwardly directed pin 127 which carries rollers 128 adapted to follow within a cam slot 129 in a circular cam head 130 that is fixed by bolts 131 to the body frame 9. This cam groove is so formed that as the drum is revolved the dies 125 will be moved reciprocally into and from closed relation with their respective base dies, as is illustrated particularly in Figure 2.

Each of the die members 125 has a shaping head member 135 mounted therein which has a limited sliding movement in the longitudinal direction of the mounting members, and is adapted to be moved into and against the caps, as the dies move downwardly, to shape the base portions of the latter. The cylinders also have inwardly tapered peripheral shoulders 136 at their lower ends which are adapted to engage the inwardly curved ends of the die fingers in such manner as to move the latter inwardly against the side walls of the caps and to press these walls against the shaping heads 135 which, in the present construction are shaped in accordance with the flanged openings of bottles on which these caps are to be applied.

The cam 130 is so formed that the dies will be moved to, and held in closed position, as shown in Figure 16, during approximately three-fourths of a revolution of the drum; closing soon after passing the delivery member and moving to open position as they arrive at the discharge point which is just above the receiving side of a delivery table 140, shown particularly in Figure 9. During this interval while the dies are closed, the caps therein are baked and dried so that they will have a fixed and permanent shape when delivered from the machine.

This baking process is effected by electrically heating the upper and lower die members by the use of heating elements as indicated at 142, each of which has electric circuit connection, as indicated by the wires 143 and 144 for the lower dies, and by wires 145 and 146 for the upper dies, with contact rings 147 and 148 mounted on an insulating plate 149 fixed concentrically about the base of the drum; these rings being engaged by brushes 150 and 151 which have electrical connection with a suitable supply of electricity. It is also desired to heat the base member of the lower blanking die, preferably by the use of a circular electrically heated element 141 which is located about the opening 70 in the plate 31 and also is connected electrically with the supply of electricity. In all cases the connecting wires are suitably insulated to avoid short circuiting and may be equipped with suitable blowout fuse which are not shown in the present drawing.

As the several individual dies approach the discharge point, the upper members are moved upwardly to open position, as shown in Figure 17; initial upward movement allowing the fingers 122 to be moved to open position which will release the head 135. Since the caps are baked about these heads they will be lifted thereby from the lower dies and held thereon until the time of discharge onto the delivery table 140 from which they are advanced into the packing mechanism.

The manner of forcing the caps from the heads 135 is best illustrated in Figure 17, and the means by which this is accomplished comprises, in each die, a plunger 152 which has a head portion seated within the die head, and a supporting stem 152' extending slidably and upwardly through the same. A spring 153 encloses the stem and bears against a nut at the end thereof to normally retain the plunger in its inner position. As the cylindrical die members move upwardly, the upper ends of the plunger stems 152' are brought into engagement with arms 154 that are fixed in the drum wall and extended through slots 155 in the die cylinders, to limit further upward movement of the plungers and to cause the caps to be forced from the forming heads 135 as the latter continue to rise.

As the caps are delivered from the forming heads, onto the delivery table 140 they are taken up by the radially extending arms 160 of a delivery plate 161 that is mounted on the shaft 106, and are advanced into and along a circularly extending guideway 162 on the delivery table and are finally discharged downwardly through an opening 163 at the end of the guideway and are mechanically packed.

Before being delivered to the packing mechanism, each cap is sprayed with liquid paraffin. In the present case, the paraffin is contained in a receptacle 170, Figure 1, and is kept in a liquid state by use of a burner as indicated at 172. A tube 173 opens at its lower end into the paraffin receptacle and leads into an atomizer, which may be of any suitable character, that is connected to a downwardly opening bell 174 in the guideway directly above the path of delivery on the table 140. An air conduit 180 leads from the tank 86, forms a coil 181 in the paraffin container and finally enters the tube 173 adjacent the atomizer. A valve 185 is located in the conduit 180, as shown in Figures 1 and 6, which is intermittently opened, by means of a bell crank lever 186, having one arm connected with the valve actuating lever 187 and its other arm engageable with a cam 188 on the shaft 49, so that intermittently blasts of air may be discharged through the atomizer and which will cause the hot paraffin to be siphoned thereby and blown against the caps as they pass through the guideway of the delivery table.

By extending the air conduit through the hot paraffin, the air is heated and will not cause the paraffin to become hardened as it passes through the atomizer.

Figure 18:
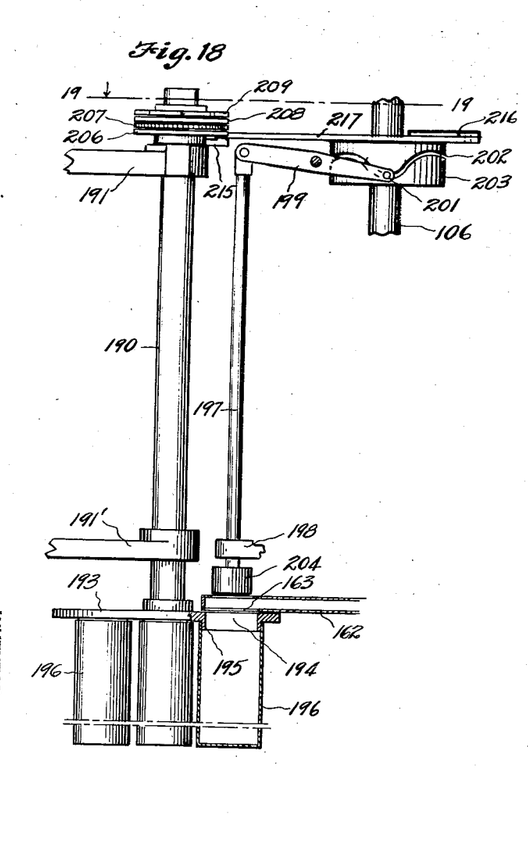
Figure 18 is a side elevation of the means for revolving the packing turret, and the packer mechanism.

Mounted at the lower end of a supporting shaft 190, that is revolubly supported from the frame 9 by brackets 191—191', Figures 6 and 18, is a turret 193 provided with a plurality of openings 194 adapted to be successively moved into registration with the discharge opening 163 of the guideway extended from the delivery table. Formed on the under side of this table 193 about the openings 194 are flanges 195 over which the receiving ends of bags 196 or other suitable containers, may be placed and held functionally to receive the caps as they are delivered from the table 140.

The means for packing the caps into the containers comprises a reciprocating rod 197 which is slidable at its lower end in a guide bracket 198 and at its upper end is pivotally attached to the outer end of a lever 199 that is pivotally supported from the frame 9 by a bracket 200. The inner end of the lever is equipped with a pin 201 adapted to follow a cam slot 202 in a cam 203 on the shaft 106. The cam is so constructed that the rod 197 will be reciprocated at proper times and in accordance with the rate of discharge of the caps so that a head 204 at its lower end will be moved into and from the opening 163 to advance each cap into the receiving bag.

Means is also provided whereby the turret 193 can be partially revolved, after a certain pre-determined number of caps have been packed into the receiving bags, to advance the next bag to receiving position.

This is best illustrated in Figures 6, 18, 19, 20, 21 and 22.

Figures 20, 21, 22:
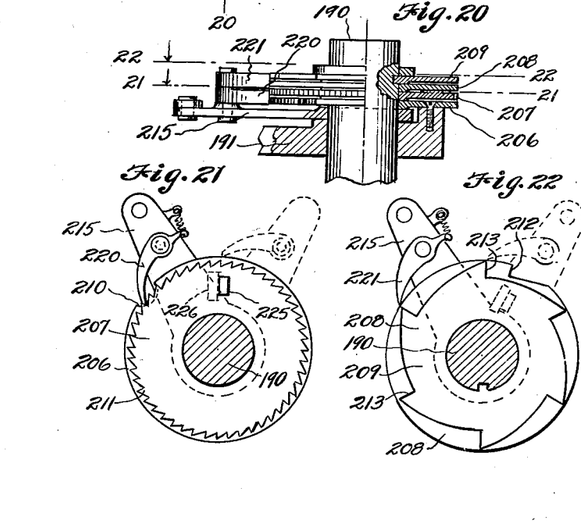
Figure 20 is an enlarged side view, partly in section, of the turret advancing mechanism.
Figure 21 is a horizontal section taken on the line 21—21 in Fig. 20.
Figure 22 is a horizontal section taken on the line 22—22 in Fig. 20.
Figure 24:
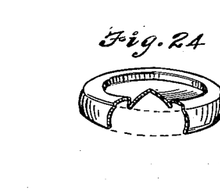
Figure 24 is a perspective view of a finished cap.

On the upper end of the shaft 190 are mounted four circular, super-imposed plates 206, 207, 208 and 209; the lower plate 206 having a smooth periphery and provided at one point with a recess 210 as shown in Figure 21. The plate 207, which rests upon the plate 206, has ratchet teeth 211 about its periphery; the number of teeth corresponding to the number of caps that are to be packed into each of the containers 196.

The plate 208, which is next above the plate 207, has a smooth peripheral edge except at one point where it is provided with a notch 212, Figure 22, and the upper plate 209 has a plurality of equally spaced peripheral notches 213; the number corresponding to the number and spaced according as are the containers that are mounted on the turret 193. The plate 209 is keyed to the shaft 190 but the other plates are free to revolve thereon.

Figure 19:
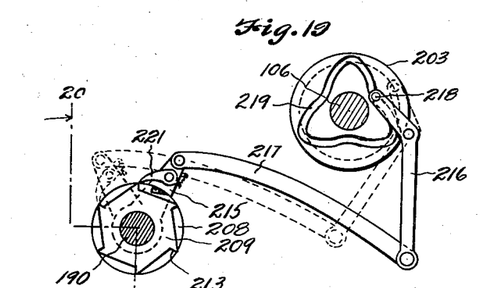
Figure 19 is a sectional view on the line 19—19 in Fig. 18.

Pivotally mounted on the shaft 190 just below the plate 206, is an arm 215 which is adapted to be oscillated, at its outer end, through a definite arc, as is illustrated in Figure 19, by connection with the cam 203. The means of oscillating, comprising a pivotally supported bell crank lever 216 that is connected at one end to a link 216, which in turn connects with the arm 215 and at its opposite end has a pin 218 therein adapted to follow a cam slot 219 in the upper face of the cam 203 in such manner that the revolving of the cam will cause the arm 215 to be oscillated.

Pivotally mounted in the arm 215 are two pawls 220 and 221, Figures 20, 21 and 22. The pawl 220 is adapted to ride along the edge of the plate 206 and is held thereby from engagement with the ratchet teeth of the plate 207 except at near the end of its travel when it drops into the recess 210 and is permitted to engage the ratchet surface, and to advance the ratchet disc an interval equal to the spacing of the teeth.

On the upper face of the plate 207 is a lug 225 which is adapted to engage a lug 226 on the underside of the plate 208 in such manner that the plate 208 will be advanced with the plate 207 but is not attached thereto.

The pawl 221 which lies just above the pawl 220 is adapted to move in engagement with the edge of the plate 208 and to normally oscillate without causing any movement of the plates 208 or 209 except at such time when the plate 208 has been advanced sufficiently that the pawl 221 will be permitted to drop into the notch 212. It drops into this notch when at its inner limit of travel and simultaneously drops into one of the notches 213 so that when it moves forwardly again it rotates the plate 209 to advance the turret accordingly, to advance the filled container 196 and bring the next container into receiving position below the packer head 204.

With the different parts so constructed and assembled it will be seen that the web will be advanced continuously through the printing mechanism and steaming oven where the pull is heavy and will in this way prevent its being broken.

It is also noted that intermittent movement of heavy parts has been avoided and this facilitates production and adds to the life of the operating mechanism.

It will be observed also that the caps are cut from the moistened strip, advanced through the blanking die where they are partially formed, forwarded to the forming and baking dies, delivered to the receiving table, given a protective coating of paraffin and are then mechanically packed.

While I have described mechanism for producing a milk bottle cap of a special shape, it is not intended to limit the machine only to the manufacture of such caps, as it is apparent that by changing the dies shown for others of different character, caps for jars, bottles and various containers could likewise be produced.

I claim:—

1. In a machine for forming articles from an endless strip of paper, or the like, in combination, means for intermittently advancing the strip, a blanking die having an opening therethrough, a receiving plate, a reciprocating die head co-acting with the blanking die to cut the article forming blanks from the strip and to advance the same through the die opening to partly shape the article, a rotating member, a plurality of forming dies arranged circularly thereon, means for transferring the partly shaped articles from the receiving plate into successive dies of the rotating member and means for actuating the latter dies to shape the articles therein and to discharge them as the dies successively approach the receiving position.

2. In a machine for forming articles from an endless strip of paper, or the like, a blanking die, a reciprocating die head co-acting with the blanking die to cut the article forming blanks from the strip and to partially form the article, means for advancing the strip to the blanking dies, a plurality of forming dies, means for forwarding the partly formed articles from the blanking dies to the forming dies, a reciprocally movable presser plate operable against the partly formed articles to center them in the forming dies and means for actuating the forming dies.

3. In a machine for forming articles from an endless strip of paper or the like, in combination, means for intermittently advancing the strip, a blanking die, a reciprocating die head, co-acting with the blanking die to cut out circular article forming blanks from the strip, to form a peripheral rim thereon, and to discharge the same onto a receiving plate, a continuously rotating drum mounted adjacent said plate having a plurality of forming dies arranged circularly and at regular intervals thereon and adapted to receive said blanks, a guideway through which said blanks may be forwarded from the blanking to the forming dies and a rotating plate having arms extending therefrom to engage said blanks as delivered onto said receiving plate and to forward the same through said guideway to the forming dies.

4. In a machine for forming articles from an endless strip of paper or the like, in combination, a receiving plate, a blanking die member having a central opening therein, means for intermittently advancing the strip across said die member, a reciprocating die head co-acting with the said blanking die to cut out circular blanks from the strip and to advance them through said die opening in such manner as to form a peripheral rim thereon and to deliver the same onto the receiving plate, a continuously rotating drum comprising a horizontal surface on the same level with said plate and having a plurality of upwardly opening forming dies arranged circularly therein concentric with the drum, a guideway mounted on said receiving plate and extending to said drum to deliver the blanks to the path of the forming dies, a rotating disk having arms extending therefrom to engage said blanks as delivered onto said receiving plate to forward the same along the guideway, and a vertically movable presser plate mounted above the delivery end of said guideway for pressing and centering said blanks in said forming dies.

5. In a machine for forming articles from an endless strip of paper or the like, the combination with a plurality of forming dies, a base die member having an opening therein and having a cutter member thereon, a reciprocating die head operable toward and from the base member, a cutter on said head co-operable with the base die cutter to cut blanks from the strip, a plunger mounted in the said head co-axially alined with the base die opening and means for causing the plunger to be extended from the head to advance said blanks through the base die opening to shape the blanks to partly form the articles, and means for transferring the partly shaped articles into the forming dies.

6. In a machine for forming articles from an endless strip of paper or the like, in combination, a base die member provided with a cutter member and having a central opening therein, a reciprocating die head operable toward and from the base die, a cutter on said reciprocating die head adapted to co-operate with the base die cutter to blank the articles from the strip, a plunger mounted in the reciprocating head, yieldable means for retaining said plunger in retracted position within the head and means for intermittently delivering air under pressure against the plunger to extend the same to advance the blanks cut from the strip through the base die opening.

7. In a forming machine, a forming die comprising a circular base block, a plurality of pivotally mounted, inwardly yieldable fingers arranged about said block; said fingers having inwardly curved upper ends, an upper reciprocating die member co-acting with the base member comprising a cylindrical body having a head centrally thereof adapted to be moved against and from the base block, said cylindrical body having an inwardly tapered annular shoulder engageable with the curved ends of said fingers when it moves downwardly to press the latter against the head, a plunger mounted in said head, and means for extending the plunger therefrom when disengaged from the base block.

Signed at Seattle, Washington, this 29th day of September.

WILLIAM Y. FARNSWORTH.